United States Patent [19]

Jedlinski et al.

[11] 4,293,685
[45] Oct. 6, 1981

[54] METHOD FOR MANUFACTURING CROSSLINKED POLYETHERESTER RESINS

[75] Inventors: Zbigniew Jedlinski, Gliwice; Bogdan Thomalla; Antoni Kotas, both of Zabrze; Stanislaw Jedlinski, Debica; Wladyslaw Pilat; Jan Jach, both of Nowa Sarzyna, all of Poland

[73] Assignee: Polska Akademia Nauk Zaklad Polimerow, Zabrze, Poland

[21] Appl. No.: 88,278

[22] Filed: Oct. 25, 1979

[30] Foreign Application Priority Data

Oct. 20, 1978 [PL] Poland .................................. 210406

[51] Int. Cl.³ ...................... G08G 63/02; G08G 63/18
[52] U.S. Cl. ...................................... 528/190; 525/36; 528/298; 528/301; 528/303
[58] Field of Search ............... 528/190, 298, 301, 303; 525/36

[56] References Cited

U.S. PATENT DOCUMENTS

| 3,838,106 | 9/1974 | Shuki et al. | 528/301 |
| 3,923,928 | 12/1975 | Atkins et al. | 528/301 |
| 4,115,362 | 9/1978 | Inata et al. | 528/190 |

*Primary Examiner*—Lucille M. Phynes
*Attorney, Agent, or Firm*—Ladas & Parry

[57] ABSTRACT

The invention relates to a method for producing crosslinked polyetherester resins having high heat resistance and mechanical strength, high flexibility and elongation.

The aim of the invention is introducing long-chain polyether blocks of the following formula

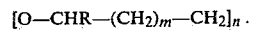

where
R=H, CH₃, or C₂H₅, n=2–15 and, m=0–4 into the chains of polyesters obtained by the reaction of acids or anhydrides, in particular the Diels-Alder adduct of maleic anhydride with 2-naphthol.

8 Claims, No Drawings

METHOD FOR MANUFACTURING CROSSLINKED POLYETHERESTER RESINS

The invention relates to a method for producing crosslinked polyetherester resins having high heat resistance and mechanical strength, high, flexibility and elongation.

Methods are known for manufacturing polyesters from glycols and unsaturated difunctional acids wherein after curing, the polyesters with crosslinking monomers by known methods the result is polyester resins of high flexibility. The known methods comprise introducing higher glycol or alkylene acid alcohol components to a polyester chain. However after crosslinking polyesters that have such glycols in their chain, the result is polyester resins, which, have low chemical resistance and low mechanical strength parameters at increased temperatures even though they have high flexibility. Methods are also known for obtaining unsaturated polyester resins from glycols and mixtures of ethylene glycol, dimethylene glycol, triethylene glycol or propylene glycol. Polyesters obtained in such a way also have low mechanical strength, heat resistance and hydrolytical stability.

The aim of the invention is increasing flexibility of crosslinked polyester resins, while retaining high heat resistance and chemical resistance.

The invention comprises a method for the production of cross-linked polyether polyester resins comprising polycondensing of saturated dicarboxylic acids or their anhydrides and unsaturated dicarboxylic acids or their anhydrides with glycols and then copolymerising with a cross-linking monomer wherein as a saturated carboxylic acid, the Diels-Alder adduct of 2-napthol with maleic acid anhydride is used, and wherein as a glycol is used a mixture of a low molecular weight glycol and a high molecular weight glycol hydroxyoligoether of the formula H—[O—CHR—(CH$_2$)$_m$—CH$_2$]$_n$OH wherein
R=H, CH$_3$, C$_2$H$_5$,
n=2–15,
and m=0–4.

The percentage of low molecular weight glycol to hydroxyoligoether is 0 to 90% wt. of the total amount of glycol compounds. As a low molecular weight glycol ethylene glycol, propylene glycol, or butylene glycol are used. The polycondensing reaction is carried out at 130°–220° C. until the acid value of polyetheroester reaches 10–30 mg KOH/g. Hydroxyethers are added in two portions, the first one simultaneously with the adduct or optionally with the other difunctional acids or anhydrides and the second one when the acid value of the reaction mixture is in the range of 50–90.

Depending on their softening point polyetheroesters obtained in such way could be comminuted and stored as a bulk material. Or they could be dissolved in the monomer with inhibitors added and crosslinked by known methods of crosslinking conventional unsaturated polyester resins.

The mechanical strength parameters of resins obtained in such a way are much better or similar to conventional resins simultaneously, the resins have high flexibility e.g. elongation till rupture is 50–150% greater than in the case of an unelasticized resin.

The method according to the invention is presented more particularly in, but is in no way limited to the following examples.

EXAMPLE 1

0.8 moles of the diene adduction product of 2-naphtol with maleic anhydride, 1.2 moles of maleic anhydride, 1.5 moles of 1,2-propylene glycol and 0.3 moles of a hydroxyoligoether of formula

where
m=0
n=8
and R=H
were supplied into a glass reaction vessel, provided with an oil bath, agitator, thermometer, reflux condenser and a nitrogen duct.

The reaction mixture was heated until melted, the agitator was put in motion, and the temperature was raised to 190° C. After the acid value of the reaction mixture reached 60 mg KOH/g the remaining portion of propylene glycol i.e. 0.3 moles were supplied.

The reaction was carried until the acid value of polyester reached 30 mg KOH/g and then the melted polyester was granulated. The softening point of the polyester is 69° C. Immediately before, processing into the crosslinked resin, 55% by wt. of the granulated polyetheroester was dissolved in 45% by wt. of styrene. The resin obtained in such a manner was cured with 2 parts by weight of Ketonox and 1 part by weight of a 1% solution of cobalt naphthenate in styrene. After crosslinking the resin has a Marten's thermal deformation temperature of 80° C., a unit elongation by rupture of 29%, a bending strength of 1100 kG/cm$^2$ (110 MPa), a rupture stress of 420 kG/cm$^2$/42 MPa/, and water absorption after 7 days was 0.21 at a temperatue of 21° C.

EXAMPLE 2

A crosslinked polyester resin as in the example 1 was obtained, the difference being that the hydroxyoligoether of the formula

the difference being that there was supplied
where
R=CH$_3$
m=0
and n=6
was used for the polyetheroester synthesis.

The temperature of the reaction as 200° C. The resin has a Marten's thermal deformation temperature of 82° C., a unit elongation by rupture of 2.7%, a bending strength of 1050 kG/cm$^2$(105 MPa), and a rupture stress of 460 kG/cm$^2$(46 MPa).

EXAMPLE 3

A cured polyester resin as in example 1 was made, the difference being, that the hydroxyoligoether of formula

where
m=2
n=5
and R=H
was used for the unsaturated polyetheroester synthesis. The temperature of the reaction was about 200° C. The resin has a Marten's thermal elongation temperature at 76° C., a unit elongation by rupture of 3.2%, a bending strength of 1250 kG/cm² (125 MPa), and a rupture stress of 510 kG/cm² (51 MPa)

EXAMPLE 4

A cured resin as in example 1 was made, the difference being that there was supplied to the reaction mixture 2.07 moles of the compound of the formula H—[O—CHR—(CH₂)$_m$—CH₂]$_n$—OH where
m=1
n=2
R=H and 0.03 moles of 1,2-propylene glycol. The temperature of the reaction was 185° C. The thus obtained cured resin has a Marten's softening point of 56° C., a bending strength of 520 kG/cm² (52 MPa), and a rupture stress of 310 kG/cm² (31 MPa).

The softening point of the unsaturated polyester is 41° C., and the polyester was dissolved in styrene of another monomer and processed as in the example 1.

EXAMPLE 5

0.6 moles of the diene adduction product of 2-naphtol with maleic anhydride, 1.2 moles of maleic anhydride, 0.2 moles of adipic acid, 1.6 moles of propylene glycol, and 0.5 moles of a hydroxyoligoether of formula H—[O—CHR—(CH₂)$_m$—CH₂]$_n$OH where
m=0
n=5
and R=CH₃ were supplied to a reaction vessel provided with an oil bath, reflux condenser, the agitator, thermometer, and nitrogen duct. The reaction was carried out at the temperature of 200° C. until the acid value of the product reached 30 mg KOH/g.

55% wt. of the product was dissolved in 45% wt. of styrene. The resin obtained in this manner was cured with 2 parts by weight of Ketonox and 1 part by weight of a 1% solution of cobalt napthenate in styrene.

After curing the resin has a Marten's thermal elongation temperature of 65° C., a unit elongation by rupture 48%, the a bending strength of 1150 kG/cm² (115 MPa) a rupture stress of 480 kG/cm² (48 MPa).

EXAMPLE 6

A polyester resin as in example 5 was obtained, the difference was, that instead of adipic acid phthalic anhydride was used.

Polycondensation temperature was 215° C. The thus obtained resin has a Marten's heat resistance of 65° C., a unit elongation by rupture of 3.3% a bending strength of 1170 kG/cm² (117 MPa), and a rupture stress of 430 kG/cm² (43 MPa).

What we claim is:

1. A method for the production of cross-linked polyether polyester resins comprising polycondensing of saturated dicarboxylic acids or their anhydrides and unsaturated dicarboxylic acids or their anhydrides with glycols and then copolymerizing with a cross-linking monomer wherein as a saturated carboxylic acid, the Diels-Alder adduct of 2-napthol with maleic anhydride is used, and wherein as a glycol is used a mixture of low molecular weight glycol and a high molecular weight glycol-hydroxyoligoether of the formula H—[O—CHR—(CH₂)$_m$—CH₂]$_n$OH wherein
R=H, CH₃, C₂H₅,
n=2–15,
and m=0–4.

2. The method of claim 1, wherein the amount of low molecular weight glycol and high molecular weight glycol-hydroxyoligoether is about 0 to 90 parts by weight of the total amount of glycol compounds.

3. The method of claim 1, wherein as low molecular weight glycols, ethylene glycol, propylene glycol, or butylene glycol are used.

4. The method of claim 1, wherein the reaction of polycondensation is carried out at a temperature in the range of from 130°–220° C. for from about 18 to 26 hours.

5. The method of claim 1, wherein the adduct of 2-naphtol with maleic acid anhydride is used itself or in mixture with phthalic acid anhydride or in mixture with other unsaturated dicarboxylic acids having the formula C$_n$H$_{2n-2}$(COOH)₂, wherein n=2–10.

6. The method of claim 1, wherein as an unsaturated dicarboxylic acid or anhydride, maleic acid anhydride is used.

7. The method of claim 1, wherein as a cross-linking monomer, styrene is used.

8. The method of claim 5, wherein the synthesis of the adduct is carried out directly by polycondensation in the presence of other dicarboxylic acids and glycols in the same reactor at a temperature in the range of from about 150° to 220° C. for from about 2 to 4 hours.